United States Patent [19]

Jirousek et al.

[11] 4,317,498
[45] Mar. 2, 1982

[54] WHEEL DRIVE ASSEMBLY

[75] Inventors: Norman F. Jirousek, Garfield Heights; William M. Shipitalo, Novelty, both of Ohio

[73] Assignee: Towmotor Corporation, Mentor, Ohio

[21] Appl. No.: 173,927

[22] PCT Filed: Jun. 6, 1980

[86] PCT No.: PCT/US80/00720

§ 371 Date: Jun. 6, 1980

§ 102(e) Date: Jun. 6, 1980

[87] PCT Pub. No.: WO80/02821

PCT Pub. Date: Dec. 24, 1980

Related U.S. Application Data

[63] Continuation-in-part of Ser. No. 89,125, Jun. 14, 1979, abandoned.

[51] Int. Cl.$^3$ .............. B60K 17/04; F16D 55/40
[52] U.S. Cl. ................... 180/70 R; 74/391; 188/71.5
[58] Field of Search ........... 180/70 R, 75, 242, 10; 74/391, 801; 192/4 A; 188/71.1, 71.5, 18 A, 170

[56] References Cited

U.S. PATENT DOCUMENTS

| | | | |
|---|---|---|---|
| 3,115,204 | 12/1963 | Dence | 180/10 |
| 3,771,627 | 11/1973 | Caldwell et al. | 188/170 |
| 3,773,152 | 11/1973 | Sitton | 188/170 |
| 3,834,498 | 9/1974 | Ashfield | 192/4 A |
| 3,927,737 | 12/1975 | Prillinger et al. | 188/71.5 |
| 4,037,694 | 7/1977 | Keese | 188/71.5 |
| 4,142,615 | 3/1979 | Sidles et al. | 192/4 A |
| 4,160,497 | 7/1979 | Galicher | 74/391 X |

FOREIGN PATENT DOCUMENTS 1483731 8/1977 United Kingdom ............. 188/71.1

*Primary Examiner*—John A. Pekar
*Attorney, Agent, or Firm*—William B. Heming

[57] ABSTRACT

A wheel drive assembly (10) for a vehicle has a spindle (14) with a bore (24). A shaft (30) is positioned within the bore (24) and defines a cavity (44) between the shaft (30) and spindle (14). A brake (46) is positioned within the cavity (34). A planetary gear assembly (74) is positioned about the shaft (30) and contained within the spindle bore (24). With the brake (36) and planetary gear assembly (40) positioned within the spindle (14), the spindle (14) constitutes a reaction ring gear. Bearings (94,96) riding on the spindle (14) can be spaced apart substantially the entire length of the spindle (14) to reduce disproportionate or excessive loading on the bearings (94,96). Serviceability of the drive assembly (10) is simplified owing to the arrangement of its components and the overall width of the vehicle is not increased while accommodating the widely spaced bearings and spindle support for the planetary gear assembly (74).

16 Claims, 2 Drawing Figures

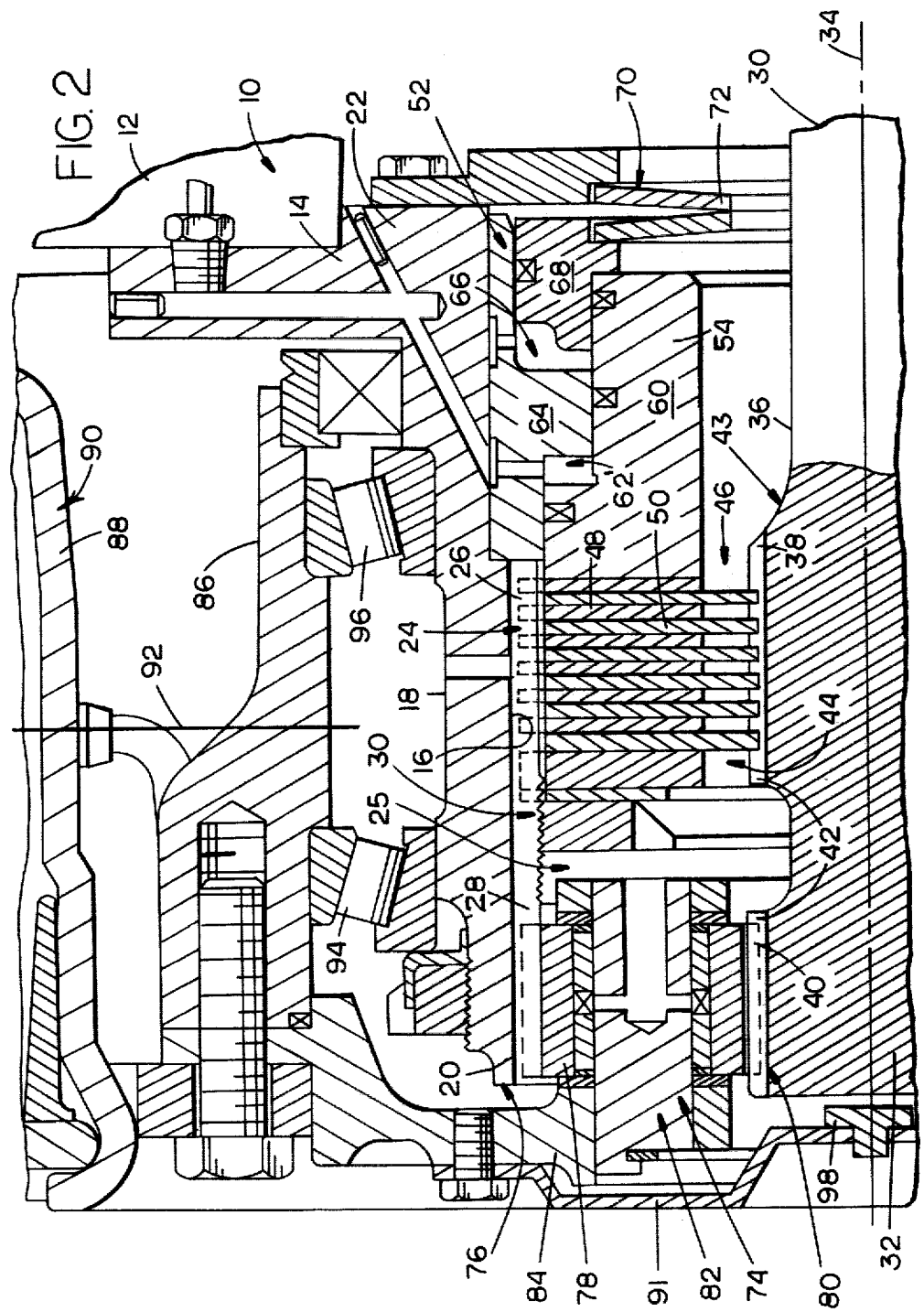

WHEEL DRIVE ASSEMBLY

CROSS REFERENCE TO RELATED APPLICATIONS

This application is a continuation-in-part of application Ser. No. 89,125 filed June 14, 1979, by Norman F. Jirousek, et al, now abandoned.

DESCRIPTION

Technical Field

This invention relates to a wheel drive assembly for a vehicle and more particularly to a mounting and servicing arrangement for the brake and planetary reduction gears.

Background Art

Industry standards limit the overall width of vehicles, such as lift trucks for example. In lift trucks, the overall width is selected so that the lift truck can maneuver in the aisles of a work environment such as a warehouse or factory. By limiting vehicle width, each vehicle is able to maneuver within the aisles which have standard widths. Since the vehicle width is limited, the space available for the wheel drive assembly is also limited.

In a wheel drive assembly, the braking is usually provided on the axle inboard of the planetary reduction gearing. Typically, the spindle extends far enough to encompass the brake about the axle shaft but the shaft protrudes farther from the longitudinal centerline of the vehicle than the spindle so that the pinion gear of the planetary reduction gear assembly can be mounted on the shaft. The planetary reduction gearing assembly is normally positioned farther from the vehicle centerline than the spindle and has a ring gear of a larger diameter than the diameter of the spindle. Such wheel assemblies are described in U.S. Pat. No. 4,037,694 which issued on July 26, 1977 to Beverly W. Keese.

Such a spindle thus supports the ring gear of the planetary gear assembly in a cantilevered fashion which positions the planetary gearing assembly beyond the spindle. The fully support of the spindle is therefore not realized, which necessitates the spindle being made shorter to accommodate the gearing without increasing the overall width of the vehicle. Reducing the length of the spindle forces the bearings to be placed closer together and often away from the midcircumferential plane of an associated tire which reduces bearing life. Also, wheel assemblies using short spindles are multi-piece assemblies which are less rigid and more costly to manufacture. It is therefore desirable to have a simplified structure which provides maximum spacing between bearings supporting a wheel hub on the spindle and maximum support for the gearing without increasing the width of the vehicle.

The present invention is directed to overcoming one or more of the problems as set forth above.

DISCLOSURE OF INVENTION

In one aspect of the present invention, a wheel drive assembly comprises a spindle which has a bore. A shaft is positioned within the bore and defines a cavity between the shaft and the spindle. A brake is positioned within the cavity and a planetary gear assembly is positioned about the shaft and contained within the spindle bore.

Containing the planetary gear assembly within the spindle bore provides maximum spindle support for the planetary gear assembly and reduces the width and overall diameter of the wheel assembly. Since the brakes and planetary gears are inside the spindle, the outside of the spindle is available to increase the spacing between bearings and maximize the load carrying ability and the lift of the bearings.

BRIEF DESCRIPTION OF THE DRAWINGS

FIG. 2 is a view similar to FIG. 1 but showing another embodiment.

BEST MODE FOR CARRYING OUT THE INVENTION

Figure 1:
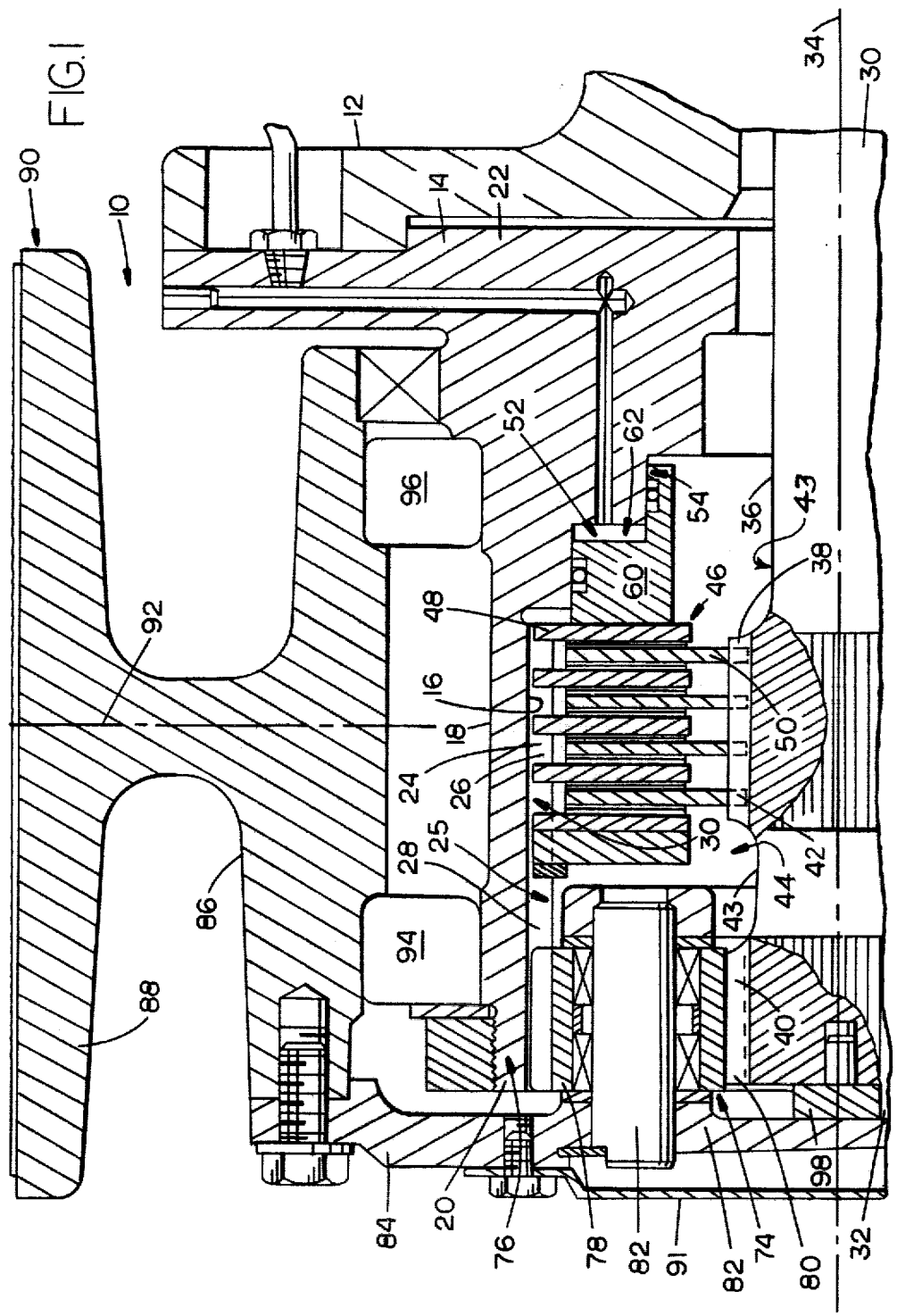
FIG. 1 is a diagrammatic cross-sectional view of a wheel drive assembly.

Referring to the drawings, a wheel drive assembly 10 is shown connected to the frame 12 of a vehicle, such as a lift truck for example. The wheel drive assembly 10 includes a spindle 14 which has an inner surface 16, an outer surface 18, a first end 20, a second end 22, and a bore 24. The spindle 14 is connected to the vehicle frame 12 by bolts or any other well known means. The spindle 14 can also be part of a differential or axle housing. The bore 24 of the spindle 14 has a first portion 25 which is of a substantially uniform cross-sectional area. The bore 24 is also shown stepped at other locations to accommodate parts of varying diameters, as will be more fully explained hereinafter. The spindle 14 has first and second sets 26,28 of inner teeth 30 on its inner surface 16 and extending into the bore 24 which are preferably integral one with the other such as the continuous arrangement of teeth shown integral with the spindle 14.

The wheel assembly 10 also includes a jack or axle shaft 30 which has an end portion 32, a longitudinal axis 34, and an outer surface 36. The shaft 30, which extends through the vehicle frame 12 to the drive train of the vehicle, as is known in the art, has first and second sets 38,40 of outer teeth 42 on the outer surface 36 and is concentrically positioned within the spindle bore 24. Thus, the shaft 30 defines a cavity 44 at or along said first portion 25 of the bore 24 between the inner surface 16 of the spindle 14 and the outer surface 36 of the shaft 30. In other words, the cavity 44 is an annulus having a substantially uniform outer periphery. The sets 38,40 of outer teeth 42 on the shaft 30 are preferably integral with the shaft 30. A portion 43 of said shaft 30 also defines a reduced cross-sectional area relative to the cross-sectional area of the shaft 30 at said sets 38,40 of teeth 42. The shaft 30 thus "necks" down to reduced diameter on the downstream side of power flow in the drive assembly 10.

A disc brake 46 is positioned within the cavity 44. The disc brake 46 includes a friction disc 48 and a reaction disc 50 (shown as a plurality of each) one of which, such as the friction disc 48, is positioned in mated relationship with the first set 26 of inner teeth 30. The other of the discs or reaction disc 50 is positioned in mated relationship with the first set 38 of outer teeth 42. Thus, the teeth 30,42 act as a splined connection to fix the discs 48,50 to the shaft 30 and spindle 14 in a manner commonly known in the brake art.

Means 52 is provided for activating the brake 46 for blocking relative motion between the shaft 30 and the spindle 14. In the embodiments shown, the activating means 52 includes first (FIGS. 1 and 2) and second (FIG. 2 only) piston assemblies 54,56 each of which are movable relative to and operably associated with the brake 46 and positioned within the bore 24. The piston assemblies 54,56 are preferably of different diameters than the brake 46 which results in the bore 24 being stepped at the locations of the piston assemblies 54,56 in the bore. The assemblies 54,56 can also be of the same diameters as the brake 46 to remove the necessity of a stepped bore 24.

In the embodiment of FIG. 1, the first piston assembly 54 includes a first piston 60 slidably positioned in the bore 24 and which acts directly on a friction disc 48 of the brake 46 in response to fluidly pressurizing a chamber 62 formed between the bore 24 and the piston 60. In the embodiment of FIG. 2, a chamber element 64 is positioned in the bore 24 and defines a first chamber 62' with a first piston 60' and a second chamber 66 and a second piston 68. Both of the pistons 60',68 are slidable relative to the chamber element 64 in response to pressurizing their respective chambers 62',66. The first piston 60' also acts directly on a friction disc 48 of the brake 46. The second piston 68 is continuously urged by biasing means 70, shown as frusto-conical washers 72, toward an operable position (shown) relative to the brake 46 at which the brake 46 is activated through frictional engagement of its discs 48,50. In the embodiment shown, the second piston 68 is positioned in contact with the biasing means 70 and is contactable with the first piston 60'. The means for fluidly operating such piston assemblies 54,56 is well known in the art and will not be discussed herein.

A planetary gear assembly 74 is positioned about the end portion 32 of the shaft 30 and contained within the first portion 25 of the spindle bore 24. The gear assembly 74 has ring 76, planet 78 and sun 80 gears and a planet carrier 82. The ring gear 76 is formed by the second set 28 of inner teeth 30 and the sun gear 80 is formed by the second set 40 of outer teeth 42. The planet gears 78 are in mated relationship with both the ring 76 and sun 80 gears.

The wheel assembly 10 also includes a housing 84 of planet carrier 82 which is connected to a supporting member, such as a hub 86 and rim 88 of a wheel 90. The housing 84, a housing cover 91, and the hub 86 of the supporting member 86,88 substantially enclose the spindle 14 at the end portion 32 of the shaft 30. The supporting member 86,88 is connected to the planet carrier 82 of the planetary gear assembly 40 and driven thereby. The wheel 90 defines a central or mid-circumferential plane 92 midway between its outermost elements but which is specifically determined by a tire (not shown) supported on the rim 88. Said plane 92 is substantially perpendicular to the shaft axis 30.

A first anti-friction bearing 94 is positioned along and in fixed contact with the outer surface 18 of the spindle 14 and with the hub 86. The first bearing 48 is preferably positioned adjacent the first end 20 of the spindle 14 at a location displaced from the mid-circumferential plane 92 in order to utilize the full width of the spindle 14. A second bearing 96 is similarly positioned along and in fixed contact with the outer surface 18 of the spindle 14 and with the hub 86 at a location displaced from the plane 92 of the wheel 90 on the opposite side of said plane 92 from said first bearing 94.

Preferably, the first bearing 94 is substantially radially aligned with the planetary gear assembly 74. Since the planetary gear assembly 74 is inside the spindle 14, the bearings 94,96 can be placed on the outer surface 18 of the spindle 14 without interfering with the action of the planetary gear assembly 74.

The housing 84 and wheel supporting member 86,88 are connected together by bolts or the like and the housing plate 91 is removable from the supporting member 86,88 to provide access to the planetary gearing 74 and the brake 46. Means 98 are provided for absorbing end thrust in the shaft. Such means 98 may take the form of a thrust button as shown.

Industrial Applicability

In the operation of the wheel drive assembly 10, power from the drive train of the vehicle (not shown) is transferred to the shaft 30 causing the shaft 30 to rotate relative to the frame 12 of the vehicle which is fixed. Since the spindle 14 is connected to the frame 12 of the vehicle, the spindle 14 remains stationary relative to the frame 12. With the brake 46 in its deenergized state (not shown), the discs 50 of the brake 46 which are connected to the shaft 30 rotate within the discs 50 which are connected to the spindle 14 thereby facilitating relative motion between the shaft 30 and the spindle 14. The rotating motion of the shaft 26 causes the sun gear 80 of the planetary gear assembly 74 to rotate. As the sun gear 80 rotates, it intermeshes with the planet gears 78 causing the planet gears 78 to rotate. The planet gears 78 rotate in an orbital manner inside of the spindle 14 which is toothed or splined to form the ring gear 76. The rotating motion from the planetary gears is transferred to the planet carrier 82 which causes the housing 84 to rotate, thereby transferring motion from the shaft 30 to the housing 84. In some industrial applications, it may be advantageous to use a suspended axle configuration in which the frame 12 is nonrigid and can move to some degree. In this event, there is still relative rotary motion between the shaft 30 and the spindle 14.

Activating the brake 74, blocks or slows rotation of the shaft 30 relative to the spindle 14. In FIG. 1, the friction and reaction discs 48,50 are shown frictionally engaged owing to fluid pressure in the chamber 62 acting on the first piston 60. The brake 74 is moved to the deenergized state by removing the fluid pressure in the chamber 62. Biasing means can be added to insure return of the piston 60 completely if drag between the discs is a problem. In FIG. 2, the brake 74 is shown in its normally activated position owing to the biasing force of the frusto-conical washers 72 acting on the discs 48,50 through the first and second pistons 60',68. The brake 74 is moved to its deenergized state by pressurizing the second chamber 66 to move the second piston 68 against the washers 72. Service brake functions can then be performed by pressurizing the first chamber 62' to urge the first piston 60' against the discs 48,50.

Since the hub 86 and rim 88 are connected to the housing 84, they rotate and any tire that is connected thereto will rotate to propel the associated vehicle. As the vehicle moves and the hub 86 rotates, it rotates about the bearings 94,96 which are substantially equally displaced from the mid-circumferential plane 92 of the wheel 90. Forces on the wheel thereby tend to affect each bearing equally. The first and second bearings 94,96 are also shown displaced their maximum distance from each other and effectively utilize the full width of the spindle 14. By spacing the bearings 94,96 as far apart as possible, any moment arm caused by forces acting on an associated tire are reduced to a minimum, thereby increasing the life of the bearings 94,96 which generally have a tendency to wear rapidly when subjected to uneven loading. Also, moving the bearings 94,96 farther apart reduces loading due to the action of the rim 88 which is cantilevered about the plane 92. The cantilever action of the rim 88 causes the bearings to be loaded unevenly by increasing the load on one of the bearings. Increasing bearing spacing reduces the cantilever effect.

In the prior art where the planetary gear assembly 74 was placed on the outside of the spindle 14, the first bearing 94 had to be located closer to the mid-circumferential plane 92 of the wheel 90 creating a moment arm which caused loads to be distributed unequally among the two bearings. Due to increased loading, the bearings wore unequally and prematurely failed. With the planetary gear assembly 74 inside the spindle 14, the bearings 94,96 can be spaced the substantially equal distances from the plane 92 and a maximum distance apart thereby sharing loads equally and compensating for any uneven loading on the hub 86 as well.

Further, by positioning the brake 46 and planetary gear assembly 74 within the spindle 14 without extending further from the vehicle frame 12 than the first end 20 of the spindle 14, the overall width of the vehicle is not affected. Since the braking and gearing are contained within the spindle 14 reaction forces are against the spindle, making the spindle essentially a one-piece braking and gearing reaction member. The locations of the braking and gearing elements also facilitate mounting within wheels of reduced diameters, the allowable dimensions of which can be sometimes limited, such as in lift trucks.

The diameter of the bore 24 of the spindle 14 at the inner surface 16 is uniform and remains uniform in the first portion 25 of the spindle bore 24 to facilitate installation and removal of the planetary gear assembly 74 and the brake 46.

For example, removing the housing 84 and cover 86 allows access to the shaft 30, planetary gear assembly 74, and the brake 46. The planetary gear assembly 74 is removed to provide access to the brake 46 which can be serviced on the vehicle. With the outer teeth 42 the same in number and profile and the inner teeth 32 the same in number and profile as shown, the brake discs 48,50 can be simply slid out along the teeth 30,42 to simplify their removal and assembly. The spindle 14 is also removable as a module with the gear assembly 74 and brake 46 assembled. When the shaft 30 is removed, the spindle 14 and wheel 90 are removable as a unit. Removal of cover plate 91 also allows partial access to the planetary gear assembly 74. Also, the "necked" down portion 43 of the shaft 30 will tend to cause a break in the shaft 30 before the brake 46 and planetary gear assembly 74 if heavy loads are exerted through the gears. The operation of the brake 46 to slow the wheel 90 will thus not be interfered with substantially.

Other aspects, objects and advantages can be obtained from a study of the disclosure, the drawings and the appended claims.

We claim:

1. A wheel drive assembly (10), comprising:
   a spindle (14) having inner and outer surfaces (16,18), a first end (20) and a bore (24) having a first end portion (25), said inner surface (46) having first and second sets (26,28) of inner teeth (30) positioned on said inner surface (16);
   a shaft (30) having an end portion (32), a longitudinal axis (34) and an outer surface (36) and being positioned within said bore (24) of said spindle (14) and defining a cavity (44) at said first portion (25) of said bore (24) between said inner surface (16) of said spindle (14) and said outer surface (36) of said shaft (30), said outer surface (36) having first and second sets (38,40) of outer teeth (42) positioned on said outer surface (42);
   a brake (46) having a friction disc (46) and a reaction disc (48) and being positioned within said cavity (44), one of said friction and reaction discs (46,48) being positioned in mated relationship with said first set (26) of inner teeth (30), the other of said friction and reaction discs (46,48) being positioned in mated relationship with said first set (38) of outer teeth (42);
   a planetary gear assembly (74) having a ring gear (76), planet gears (78) and a planet carrier (82), said planet gears (78) being in mated relationship with said second set (28) of inner teeth (30) and said second set (40) of outer teeth (42), said ring gear (76) being defined by said spindle (14) at said second set (28) of inner teeth (30);
   a wheel (90) having a load supporting member (86,88), defining a mid-circumferential plane (92) and being positioned about said spindle (14) and said end portion (32) of said shaft (30); and
   first and second bearings (94,96) positioned along and in contact with said outer surface (18) of said spindle (14) and with said load supporting member (86,88) and displaced equal distances from and on opposite sides of said mid-circumferential plane (92) for transferring external forces exerted on said load supporting member (86,88) to said spindle (14).

2. The wheel drive assembly (10), as set forth in claim 1, wherein said first and second sets (26,28) of inner teeth (30) are integral one with the other.

3. The wheel drive assembly (10), as set forth in claim 1, wherein said first bearing (94) is positioned at a location radially outwardly of said second set (28) of inner teeth (30).

4. A wheel drive assembly (10), comprising:
   a spindle (14) having inner and outer surfaces (16,18), a first end (20) and a bore (24) having a first end portion (25), said inner surface (46) having first and second sets (26,28) of inner teeth (30) positioned on said inner surface (16);
   a shaft (30) having an end portion (32), a longitudinal axis (34) and an outer surface (36) and being positioned within said bore (24) of said spindle (14) and defining a cavity (44) at said first portion (25) of said bore (24) between said inner surface (16) of said spindle (14) and said outer surface (36) of said shaft (30), said outer surface (36) having first and second sets (38,40) of outer teeth (42) positioned on said outer surface (42);
   a brake (46) having a friction disc (46) and a reaction disc (48) and being positioned within said cavity (44), one of said friction and reaction discs (46,48) being positioned in mated relationship with said first set (26) of inner teeth (30), the other of said friction and reaction discs (46,48) being positioned in mated relationship with said first set (38) of outer teeth (42);
   a planetary gear assembly (74) having a ring gear (76), planet gears (78) and a planet carrier (82), said planet gears (78) being in mated relationship with said second set (28) of inner teeth (30) and said second set (40) of outer teeth (42), said ring gear

(76) being defined by said spindle (14) at said second set (28) of inner teeth (30);

a housing (84) having a load supporting member (86,88) and being positioned about and substantially enclosing said spindle (14) and said end portion (32) of said shaft (30);

first and second bearings (94,96) positioned along and in contact with said outer surface (18) of said spindle (14) and with said load supporting member (86,88) for transferring external forces exerted on said load supporting member (86,88) to said spindle (14); and means (52) for actuating said brake (46) for blocking relative motion between said shaft (30) and said spindle (14), said means (52) including a first piston assembly (54), said first piston assembly (54) having a first piston (60) defining a chamber (62) in said bore (24) and being slidable relative to said spindle (14) in response to pressurizing said chamber (62).

5. The wheel drive assembly (10), as set forth in claim 4, including a second piston assembly (56) having a chamber element (64) and a second piston (68) defining a chamber (66) with said chamber element (64) and slidable relative to said chamber element (64) in response to pressurizing said chamber (66).

6. The wheel drive assembly (10), as set forth in claim 5, including biasing means (70) for continuously urging said second piston (68) toward an operable position relative to said brake (46) at which said brake (46) is activated.

7. The wheel drive assembly (10), as set forth in claim 6, wherein said second piston (68) is positioned in contact with said biasing means (70) and contactable with said first piston (60).

8. The wheel drive assembly (10), as set forth in claim 4, wherein said first piston (60) acts directly on said brake (46).

9. A wheel drive assembly (10), comprising:

a spindle (14) having inner and outer surfaces (16,18), a first end (20) and a bore (24) and being of one-piece construction, said inner surface (46) having first and second sets (26,28) of inner teeth (30) positioned on said inner surface (16) and integral one with the other, said bore (24) having a first end portion (25);

a shaft (30) having an end portion (32), a longitudinal axis (34) and an outer surface (36) and being positioned within said bore (24) of said one-piece spindle (14) and defining a cavity (44) at said first portion (25) of said bore (24) between said inner surface (16) of said one-piece spindle (14) and said outer surface (36) of said shaft (30), said outer surface (36) having first and second sets (38,40) of outer teeth (42) positioned on said outer surface (42);

a brake (46) having a friction disc (46) and a reaction disc (48) and being positioned within said cavity (44), one of said friction and reaction discs (46,48) being positioned in mated relationship with said first set (26) of inner teeth (30), the other of said friction and reaction discs (46,48) being positioned in mated relationship with said first set (38) of outer teeth (42);

means (52) for actuating said brake (46) for blocking relative motion between said shaft (30) and said one-piece spindle (14), said means (52) being positioned in said bore (24);

a planetary gear assembly (74) having a ring gear (76), planet gears (78) and a planet carrier (82), said planet gears (78) being in mated relationship with said second set (28) of inner teeth (30) and said second set (40) of outer teeth (42), said ring gear (76) being defined by said one-piece single (14) at said second set (28) of inner teeth (30);

a load supporting member (86,88) positioned about said one-piece spindle (14);

first and second bearings (94,96) positioned along and in contact with said outer surface (18) of said one-piece spindle (14) and in contact with said load supporting member (86,88) for transferring external forces exerted on said load supporting member (86,88) to said one-piece spindle (14), said first bearing (94) being positioned at a location radially outwardly of said second set (28) of inner teeth (30).

10. The wheel drive assembly (10), as set forth in claim 9, wherein said first and second sets (38,40) of outer teeth (42) are spaced one from the other along said shaft (30) across a portion (43) of said shaft (30) defining a reduced cross-sectional area of said shaft (30) relative to the cross-sectional area of said shaft (30) at said first and second sets (38,40) of outer teeth (42).

11. The wheel drive assembly (10), as set forth in claim 9, including a wheel (90) defining a mid-circumferential plane (92) and wherein said first and second bearings (94,96) are displaced equal distances from said mid-circumferential plane (92) of said supporting member (86,88).

12. The wheel drive assembly (10), as set forth in claim 9, wherein said second set (40) of outer teeth (42) is integral with said shaft (30).

13. The wheel drive assembly, as set forth in claim 8, wherein said first set (38) of outer teeth (42) are integral with said shaft (30).

14. The wheel drive assembly (10), as set forth in claim 9, wherein said actuating means (52) includes a first piston assembly (54) movable relative to and operably associated with said brake (46).

15. The wheel drive assembly (18), as set forth in claim 4, wherein said first piston assembly (54) includes a first piston (60) defining a chamber (62) in said bore and slidable relative to said spindle (14) in response to pressurizing said chamber (62).

16. The wheel drive assembly (10), as set forth in claim 9, including a wheel (50) defining a mid-circumferential plane (92) and wherein said load supporting member (86,88) is a portion of said wheel (90) and said first and second bearings (94,96) are positioned on opposite sides of said mid-circumferential plane (92).

* * * * *